United States Patent [19]

Latter

[11] Patent Number: 4,648,107
[45] Date of Patent: Mar. 3, 1987

[54] DEVICE FOR MEASURING THE THICKNESS OF THIN FILMS

[76] Inventor: Terence D. Latter, 76 Crockhamwell Road, Reading (Woodley), England

[21] Appl. No.: 678,248

[22] Filed: Dec. 5, 1984

[51] Int. Cl.$^4$ ............................................. G01B 15/02
[52] U.S. Cl. ......................................... 378/50; 378/46
[58] Field of Search ....................... 378/50, 46, 47, 48, 378/49; 200/61.41, 61.42, 61.20, 61.21

[56] References Cited

U.S. PATENT DOCUMENTS

| | | | |
|---|---|---|---|
| 2,851,553 | 9/1958 | Grostick | 200/61.21 |
| 3,810,386 | 5/1974 | McAshan, Jr. | 200/61.21 |
| 3,920,984 | 11/1975 | Kirkendall et al. | 378/49 |
| 4,406,015 | 9/1983 | Koga | 378/50 |

FOREIGN PATENT DOCUMENTS

| | | | |
|---|---|---|---|
| 0054912 | 3/1984 | Japan | 378/50 |
| 2129127 | 4/1984 | United Kingdom | 378/50 |

Primary Examiner—Craig E. Church
Assistant Examiner—D. Porta

[57] ABSTRACT

The device operates by means of the X-ray fluorescence principle wherein a beam of primary X-rays is directed on to a coated test specimen and X-rays emitted back by the test specimen are counted to determine the thickness of the coating. The device has a stage for supporting test specimens, an X-ray generator, a collimator device for the primary X-rays, a counter for X-rays emitted back by the test specimens, and a displacement device for moving the stage in at least one direction at right angles to the collimator device, and in the direction of the X-ray beam. A rod composed principally of aluminum of a material of low atomic number is positioned at a safe distance beneath the collimator device, and approximately at right angles to the X-ray beam. The shaft of an electric motor imparts periodic motion to the rod. An evaluating device monitors the motion of the rod and outputs a signal when the rod is momentarily stopped.

13 Claims, 5 Drawing Figures

DEVICE FOR MEASURING THE THICKNESS OF THIN FILMS

The present invention relates to a device for measuring the thickness of thin coatings by means of the X-ray florescence principle wherein a beam of primary X-rays is directed on to a coated test specimen and X-rays emitted back by the test specimen are counted to determine the thickness of the coating. The device has: stage means for supporting test specimens, an X-ray generator, a collimator device for the primary X-rays, a counter for X-rays emitted back by the test specimens, and a displacement device for moving the stage means in at least one direction at right angles to the collimator device, and in the direction of the X-ray beam.

BACKGROUND OF THE INVENTION

Devices of this type have been described, for instance, in German Patent Disclosure No. 32 39 379. Here a collimator device made of glass is used. This collimator device must retain its given configuration when installed. It would be rendered useless long before actually being destroyed, for instance, if the geometrical longitudinal axis of the X-ray beam no longer coincided with the part of the optical axis which is adjusted to coincide with the longitudinal axis by means of a mirror. It would also be unsatisfactory if the through holes described in the patent disclosure no longer run parallel to the geometrical longitudinal axis of the X-ray beam. Similarly it would also be detrimental if the collimator glass body was scratched, because the illuminated area could no longer be so clearly seen etc.

The device described in the German Patent Disclosure is an arrangement wherein the collimator glass body is not exposed to such dangers because a coating is laid on a through hole and, thus, the test specimen can never come into contact with the glass body.

There are, however, measuring devices of this type in which the test specimen to be measured is positioned, either under its own weight or by means of plasticine or similar means, on the top side of a stage or supporting means. After the test specimen has been placed on a stage, the stage is raised within a housing until a test specimen has been driven from below to the correct distance from the glass body. Seen from the viewpoint of Patent Disclosure No. 32 39 379 such measuring devices are upside down. The principle part, which can be moved over large distances, is a stage on which the test specimen lies. The test specimens lying on the stage can be of different heights. If measurements are to be made on a high object, the table must stop at a greater distance from the glass body than the case for thinner test specimens.

As is the case for most measuring devices of this type, the stage here is also not moved manually. Rather, the displacements are motor-driven via computer software.

As with a microscope, fine adjustments must be made by hand and eye. The dimensions of the test specimens can vary immensely from, for example, foils of a few tenths of a millimeter thick to spectacle frames, and can, thus, be extremely light or extremely heavy. Specimens weighing only one gram can be considered heavy in this area of technology.

If, due to error, the stage is driven too high, then, the specimen can come into contact with the collimator device embodied by the glass body and cause it to be scratched or can be pressed against the collimator device such that its geometry is no longer correct or it it completely destroyed.

OBJECT AND STATEMENT OF THE INVENTION

The object of this invention is to provide a safety device which is both inexpensive and provides reliable protection to the collimator device, which has negligible or predictable effects on the measurement results as well as allowing the designer to retain the established construction of such devices so that operating personnel do not have to be reeducated in its use.

This object is achieved, according to the invention, by a rod means positioned at a safe distance beneath the collimator device, and approximately at right angles to the X-ray beam and, bearing means for imparting periodic motion to the rod means. Of course, the periodicity in relation to the rate of displacement of the specimen support means (i.e., stage unit) is large. If the test specimens are sufficiently light, they are simply swept from the stage unit. The stage itself can then be braked on the signal of a microswitch, the latter being simple insofar as the stage configuration never changes whereas that of the test specimen does. It is far better to sweep the test specimen from the stage unit than to allow the collimator device to be exposed to danger. The test specimen could, for example, have the form of a cylindrical pin of less than 0.5 mm on the front face of which the coating is to be measured. The slightest contact with the collimator plate would in this case lead to its destruction due to the very high surface pressure generated.

Advantageously, the invention includes the following additional features:

An evaluating device monitors the motion of the rod means and outputs a signal when the rod means is momentarily stopped. This features allows that some test specimens are not swept from the table but rather bring the stage unit to a standstill. This is a solution for such cases where the test specimen is so heavy that it either stops the rod or at least momentarily stops the rod as it brushes the specimen. Such conditions are provided by heavy test specimens as well as by light test specimens which are fixed to the stage unit by plasticine or similar means.

The rod means is composed of a material of low atomic number. This feature allows the rod to emit only secondary X-rays which do not falsify the measurement result. In fact, it would also be possible to cut out electronically in the software the time interval during which the rod moves through the X-ray beam.

In order to have as few secondary X-rays as possible, the rod could also be made of carbon which has an atomic number of 6. Such a rod must, however, be manufactured, it is fragile and must be relatively thick so that it can support its own weight. With an atomic number of 12, magnesium would also be a good choice. However, because of its general availability, aluminium, provides the best solution.

The rod means comprises an aluminum knitting needle. This device cannot be beaten for price since it is a mass produced article which has already the approximate length required here, which is available in various diameters and on which no further work is necessary. Even if the knitting needle should bend, it can be easily bent straight again. The anodized coating on an aluminium knitting needle provides a ready made protective coating, thus effectively requiring no further finishing and, since the anodized coating is a compound of oxygen and aluminium, the atomic number in the coated area is effectively lower than that of aluminium. Such rods, in particular when the rod is a knitting needle, take up such a small sector of the 360° circular plane that the measurement accuracy is not affected and this effect need not be accounted for. Such a light rod can be run at a relatively high number of revolutions per minute without running into problems of unbalance.

It would also be possible to move the rod in the transverse direction beneath the collimator device. In this case, however, it must be mounted in a reciprocating bearing. When it can be turned about a shaft, the required periodicity is automatically provided and, in addition, the simplest type of bearing can be used. Since the collimator device itself lies at right angles to the X-ray beam, the following feature provides the same safety gap overall: The bearing means includes a shaft which runs at right angles to the collimator device.

The rod means is connected to the shaft approximately half way along the length of the rod means. This feature allows the frequency of monitoring to be doubled and reliably exclude problems of unbalance.

The shaft is positioned behind the counter when viewed from the collimator device. This feature allows the counter, which receives the back-scattered X-rays through a very thin fragile window, to be protected at the same time. Thus, both the counter and the collimator device are protected.

The rod means traverses the area beneath the collimator mounting means. This feature means that the rod must traverse through a larger radius. The resulting extension of the rod, however, is far outweighed by the protection of the mount since, for example, if the mount would be permanently deformed, then, the collimator device would be permanently disoriented without it being destroyed.

The shaft comprises a rotating shaft of an electric motor. This feature allows both a simple means to drive the shaft as well as providing in a simple manner the force on hand up to which the rod should stand still or sweep the test specimen from the stage unit. In addition, the increased current consumption of the electric motor when it brakes and/or stops can easily be used as a signal.

The device has kinetic energy at a level whereby test specimens lying on the stage means do not stop the rod means, but heavy objects do. This feature allows the circuit evaluating the current consumption of the electric motor to operate with relatively inexact threshold values since in practice it must be expected that the displacement device itself will consume more current as it ages with time. Consideration should also be given to the fact that the types of electric motors to be found on the market might all run too fast and thus an electric motor with reduction gears would be required. Rotation rates of 50 to 60 Hz would be far too high, since light test specimens should not be blown about due to air turbulence. Since, because of its ability for fine adjustment, the stage unit can only be moved very slowly, a relatively low periodicity of the rod is sufficient.

A cover plate is provided in areas which are not traversed by the rod means. This feature prevents the test specimens swept from the stage unit from falling into the interior of the instrument but rather allows them to be collected on the cover plate.

DESCRIPTION OF THE DRAWINGS

The invention is now described using a preferred illustrative embodiment. The drawings show.

DETAILED DESCRIPTION

Figure 1:
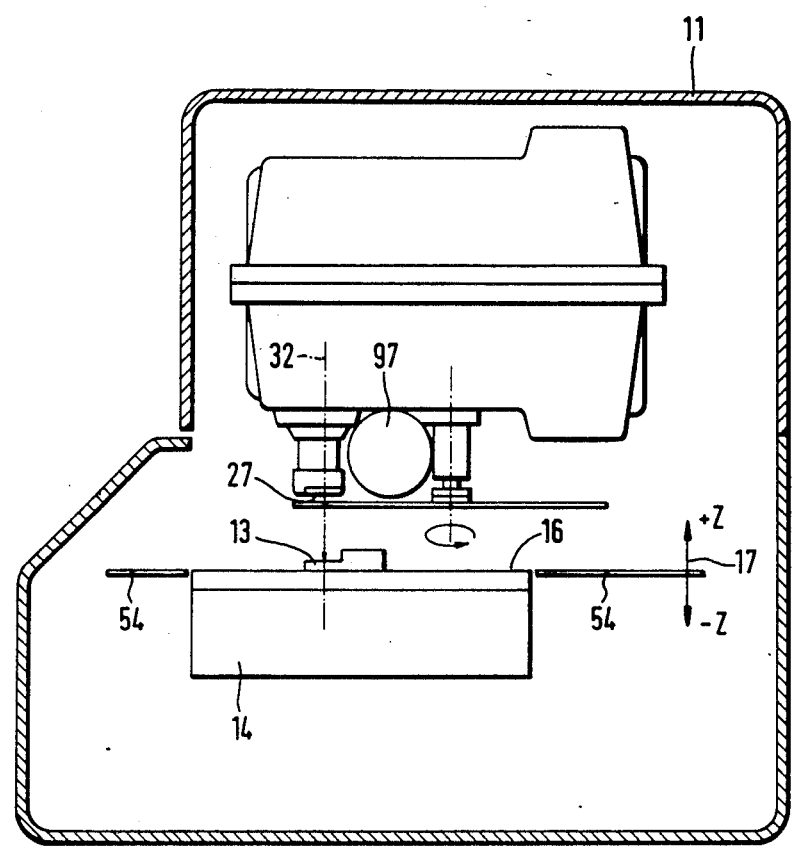
FIG. 1 A cross-section through the housing in which the device is seen as a side view.

To facilitate orientation, those reference numbers assigned to parts which were used in German Patent Disclosure No. 32 39 379 have been retained, namely the geometrical longitudinal axis 32, the X-ray tube 33, the ball cock 41, the mirror 46, the glass body 49, the optical axis 87 and the proportional counter 97 which retain the same function and principally the same configuration or the same tasks. The light source 94 also described in the patent disclosure is also to be found in the invention, but is not drawn.

Figure 3:
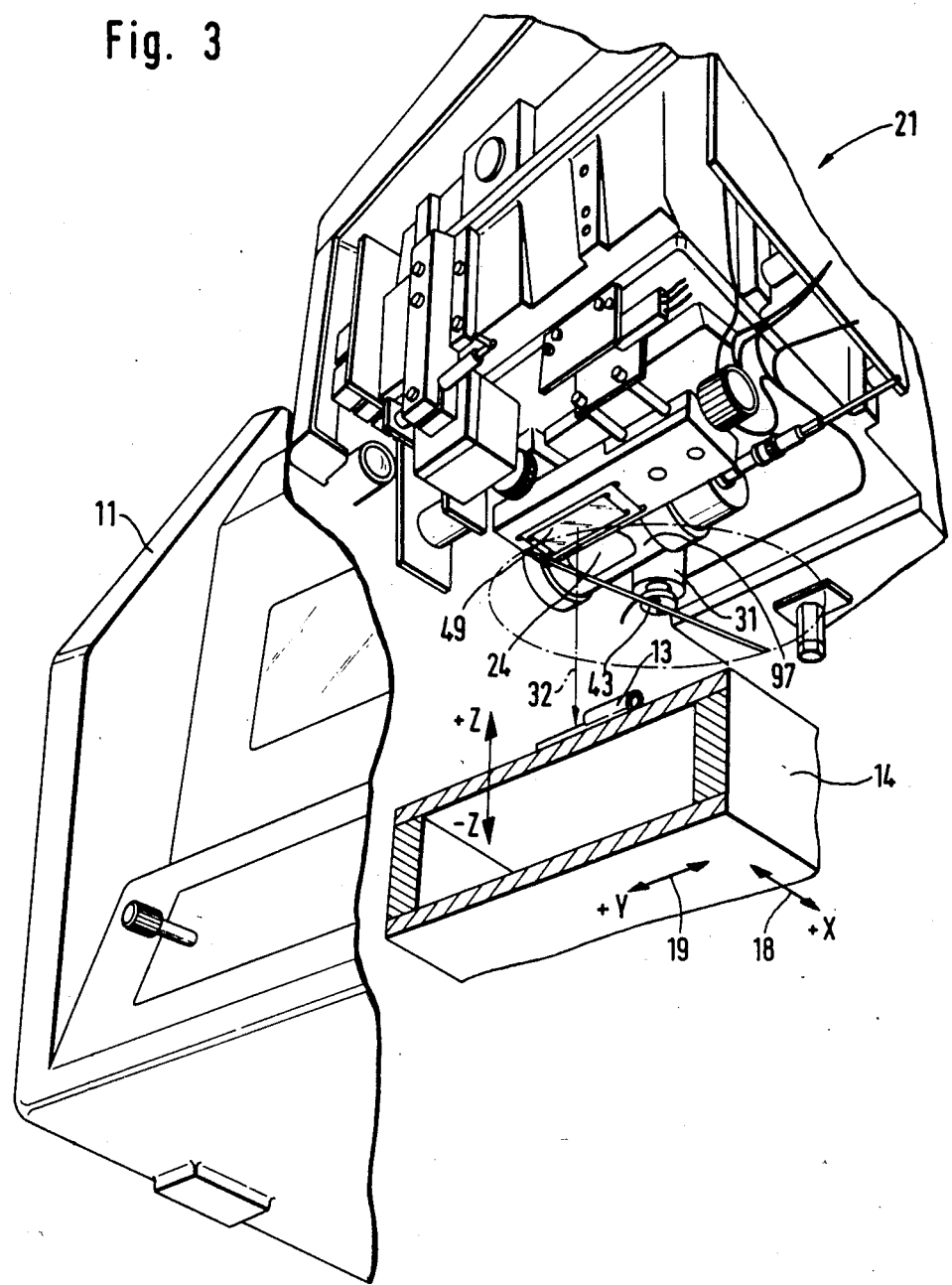
FIG. 3 A detailed prospective view from below of FIG. 2 including cutaway housing.

A housing 11 is closed on all sides and can be opened from the operating position by a loading hatch. Through this, a test specimen 13 can be laid on the stage 14 when this is at its bottom position. The stage 14 has a flat top side 16 which is also horizontal. A drive unit not shown allows the stage 14 to be driven up and down in the vertical plane as per the arrow 17. The stage 14 can also be driven in the horizontal plan in both plus and minus X and Y directions, as symbolized by the arrows 18 and 19 in FIG. 3. In the side view, the test specimen 13 has the contours of a cable shoe. The geometrical longitudinal axis 32 passes through it.

The housing 11 also contains a head 21 which is stationary with respect to said housing 11 and to the stage 14. The head 21 contains electrical circuits, drives etc. which are of no interest to the current claim. Fastened to the bottom side of the head 21 are the X-ray tube 33, a shielded lead tube 22, which, in this case, has the function of the through hole 34 described in the Patent Disclosure, coaxial with the longitudinal axis 32 the ball cock 41, the 45° mirror 46 and below, in a mount 23, the glass body 49.

Naturally, the glass body 49 can be moved according to the state of the art, in as far as it is necessary to bring the various through holes into alignment. The proportional counter 97 is fixed to the head close to the compact block, which can be particularly well seen in FIG. 2, so that its window 24 collects as many back-scattered secondary X-rays as possible from the test specimen 13. The lower face 26 of the proportional counter 97, however, lies a little higher than the lower face 27 of the glass body 49. The glass body 49 is provided with through holes from which the through hole 61 lines up with the geometrical longitudinal axis 32 as per FIG. 2.

Figure 2:
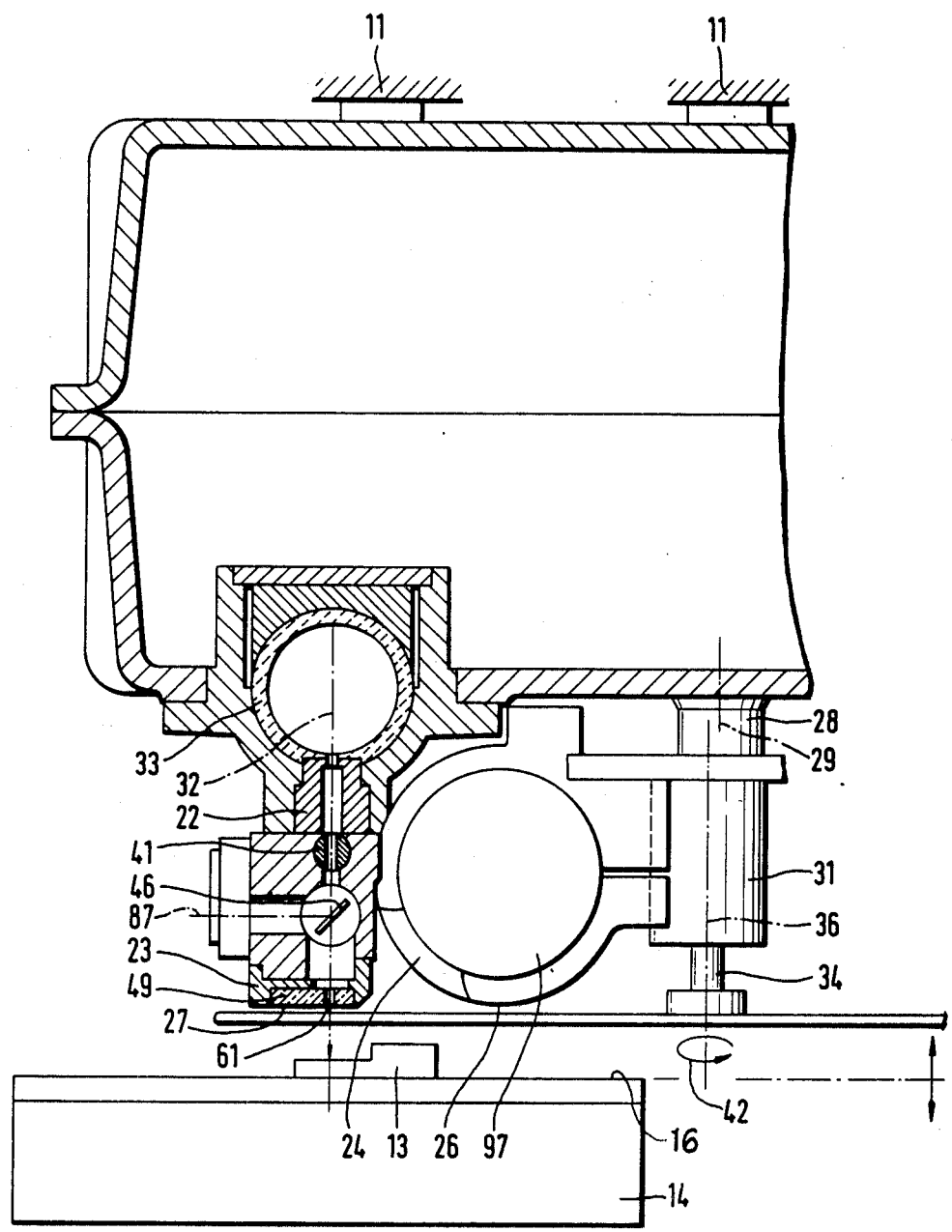
FIG. 2 A view similar to FIG. 1, however, with a partial section through the device without housing and on an enlarged scale.
Figure 4:
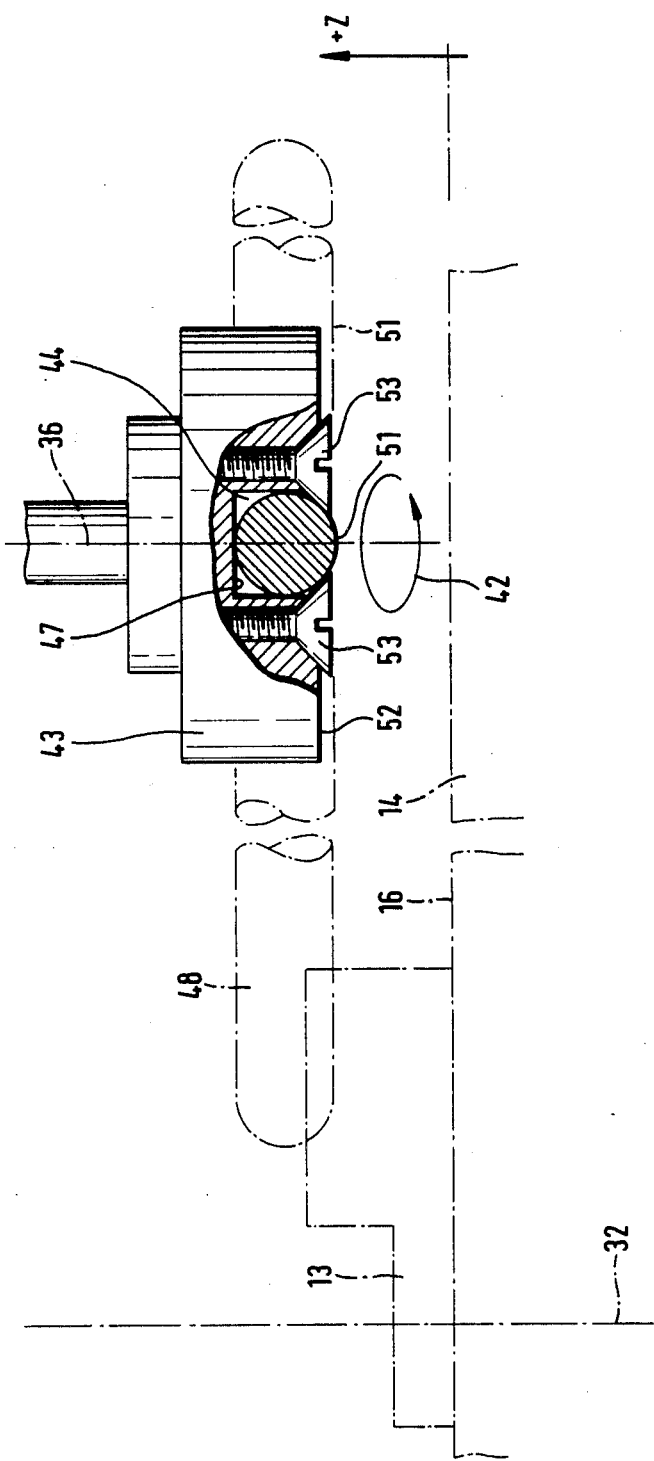
FIG. 4 A detail showing the rod fixture on a still larger scale.
Figure 5:
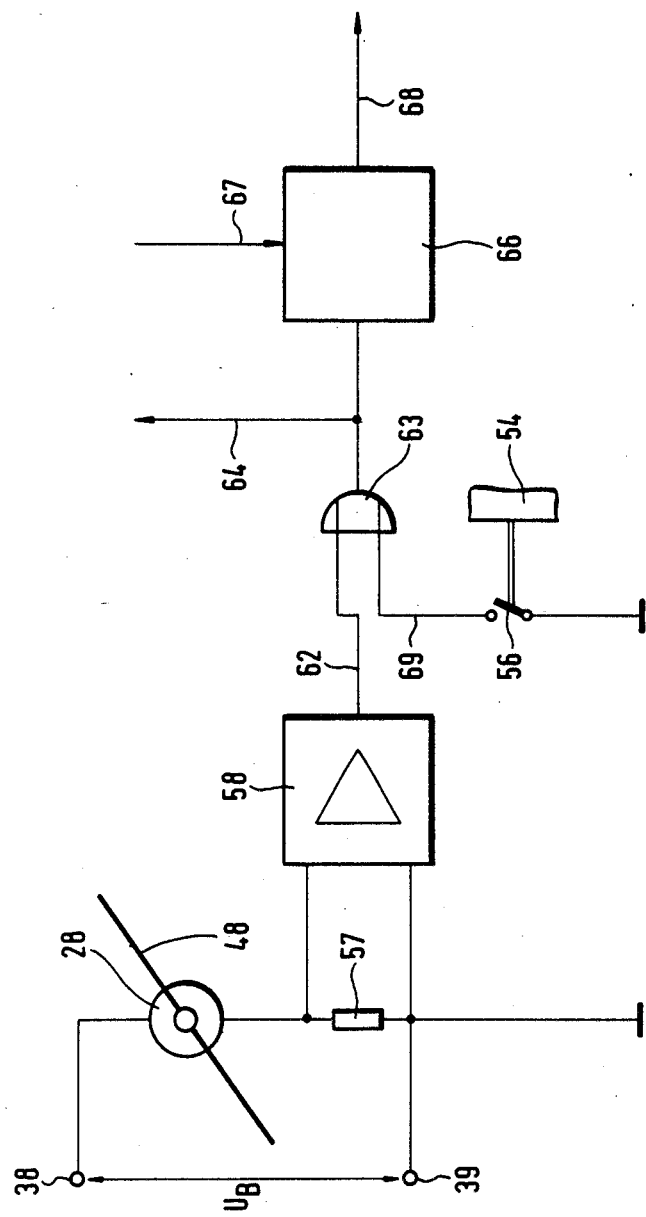
FIG. 5 A block circuit diagram explaining the electrical processing of the safety signals.

In accordance with FIG. 2, an electric motor 28, having a geometrical longitudinal axis 29, is rigidly fixed to the underside of the head 21 directly to the right of the proportional counter 97. It is shown with a single piece reduction gear 31 the drive shaft 34 of which as per its geometrical longitudinal axis 36 runs perpendicular to the underside 27 and, thus, also perpendicular to the side 16 of the stage 14. If the software or an operator applies a voltage $U_B$ to the terminals 38 and 39, then, the motor 28 runs and the drive shaft 34 turns in the direction shown by the arrow 42. The speed of revolution lies in the Hertz region. A clamping disk 43 is fixed rigidly to the bottom of the drive shaft 34 at right angles to the longitudinal axis 36. A mounting groove is machined into its bottom face. The bottom 47 of this mounting groove 44 lies at right angles to the longitudinal axis 36 or — what amounts to the same — is parallel to the underside 27 of the glass body 49. The knitting needle 48 is seated in the mounting groove 44. The former has a circular cylindrical cross-section which, as is usual for knitting needles, tapers to a short injury preventive conical tip only at its ends. The mounting groove 44 is so shallow that, because of the diameter of the knitting needle 48, the lower crown 51 of the knitting needle lies beneath the underside 52 of the clamping disk 43. Countersunk head screws 53 are screwed from below into threaded blind holes on both sides of the mounting groove 44. The tapered lower faces of the heads of the countersunk head screws 53 hold the knitting needle 41 in the mounting groove 44 and in view of the fact that they contact the knitting needle 48 somewhat above its crown 51, the front faces of the heads of the countersunk head screws 53 also lie above the plane defined by the crown 51 of the knitting needle, as per FIG. 4.

Level with the top side 16 is a horizontal cover plate 53 which moves up and down with the stage 14 represented schematically in FIG. 1 only. A microswitch 56 is fixed to the underside of the head 21 which works with the cover plate 54 and switches, if — for example, without the test specimen 13 — the cover plate 54 is driven too far in the vertical plus Z direction. In operation, the knitting needle 48 traverses a circle. If it comes into contact with a test specimen, then, the current in the series resistor 57 increases. A comparator 58 is connected parallel to the series resistor 57. This would have to have threshold values lying much too near to another, however, if the smallest changes in current in the series resistor 57 were to be used. In the case of a reduction gear, as used for example in the illustrative embodiment, such fluctuations in current would already be generated if one of the gear wheels were to run slightly excentrically. In this range of sensitivity, which cannot be covered by the comparator 58 with industrially justified measures, the test specimen 13 is swept from the top side 37 by the knitting needle 48 so that it lands, if necessary, on the cover plate 54.

In the case of heavy test specimens 13, the knitting needle brushes the test specimen 13 momentarily with ever increasing force as the stage 14 is driven in the vertical plus Z direction. Now, voltage fluctuations which can be processed by a commercial comparator 58 are generated at the series resistor 57. Moreover, it can, of course, utilize the voltage jumps generated at the series resistor 57 when the knitting needle 48 is brought completely to a standstill. Where the voltage jumps generated at the series resistor 57 can be evaluated by the comparator 58, the latter outputs a signal on the conductor 62 to an OR-gate 63. This output signal is sent via a conductor 64 to both a microprocessor and a switching device. The microprocessor outputs via the conductor 67 a corresponding signal to the switching device 66, and a stop signal for all axes plus X, minus X, plus Y, minus Y and plus Z is generated on conductor 68. Only minus Z must remain free so that the stage 14 can still be moved downwards.

The microswitch 56 which is activated by the cover plate 54 is connected to the OR-gate 63 by a conductor 69. Since a signal from the microswitch 56 has the same effect on the OR-gate 63 as the output signal from the comparator 58, the consequences are the same.

In the measurement of the thickness of thin films by means of the X-ray fluorescence method it is well known that materials with an atomic number below 20 cannot be measured. This means that the rod can be made of such a material, for example magnesium or aluminium, but could also be made of another mechanically stable compound, for example inorganic glass or organic glass. This consideration relates to the primary X-ray beam. As far as the secondary X-rays from the test specimen 13 are concerned, these are in any case shadowed by the rod no matter what material this is made of. As a consequence, the rod must be thin so that the period of shadow is as small as possible. If its thickness is kept such that the measurement result is falsified by 1% or less, then, this would be permissible since, as far as this type of measurement is concerned, the result is in any case only a statistical mathematic function. With an aluminium wire, which is what a knitting needle is, these conditions can be fulfilled without difficulty. Moreover, the rod must also exhibit sufficient stiffness so that on one hand it does not sag, thus, being lower at its extremities than in the middle. On the other hand it must also be stiff so that small test specimens are actually swept away from the top side 37 or, in the case of heavy test specimens, it can elastically or plastically bend when it meets the test specimen and the test specimen does not move.

I claim:

1. A device for measuring the thickness of thin coatings by means of the X-ray fluorescence principle, wherein a beam of primary X-rays is directed on to a coated test specimen and X-rays emitted back by the test specimen are counted to determine the thickness of the coating, comprising:

an X-ray generator, a collimator device for the primary X-rays, a counter for X-rays emitted back by the test specimens, stage means having a flat top side opposite said collimator device for supporting test specimens.

a displacement device for moving said stage means in at least the direction of the primary X-ray beam, towards and away from said collimator device.

rod means positioned between said stage means and said collimator device, close to and beneath said collimator device, said rod means being oriented approximately at right angles to the X-ray beam, and bearing means for imparting periodic motion to said rod means for movement approximately parallel to said flat top of said stage means.

2. Device as claimed in claim 1, comprising an evaluating device which monitors the motion of said rod means and outputs a signal when said rod means is momentarily stopped.

3. Device as claimed in claim 1, wherein said rod means is composed of a material of low atomic number.

4. Device as claimed in claim 3, wherein said rod means is made principally of aluminum.

5. Device as claimed in claim 4, wherein said rod means comprises an aluminum knitting needle.

6. Device as claimed in claim 1, wherein said bearing means includes a shaft which runs parallel to the direction of the primary X-ray beam.

7. Device as claimed in claim 6, wherein said rod means is connected to said shaft approximately half way along the length of said rod means.

8. Device as claimed in claim 6, wherein said shaft is positioned behind said counter when viewed from said collimator device.

9. Device as claimed in claim 1, comprising means for mounting said collimator device, wherein said rod means traverses the area beneath said collimator mounting means.

10. Device as claimed in claim 6, wherein said shaft comprises a rotating shaft of an electric motor.

11. Device as claimed in claim 1, wherein said rod and said bearing means have a kinetic energy at a level such that test specimens lying on said stage means do not stop said rod means, but heavy objects do.

12. Device as claimed in claim 1, wherein the thickness of said rod means is small in comparison to the area traversed.

13. Device as claimed in claim 1, wherein the rate of displacement of said rod means is large in comparison to the rate of displacement of said stage means.

* * * * *